(12) United States Patent
Hayashida et al.

(10) Patent No.: US 7,821,989 B2
(45) Date of Patent: Oct. 26, 2010

(54) CALL MANAGEMENT METHOD, CALL MANAGEMENT SYSTEM AND MESSAGE PROCESSING SERVER SYSTEM

(75) Inventors: Hiroyasu Hayashida, Fukuoka (JP); Kaori Chigusa, Fukuoka (JP); Ryouji Nakamatsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 11/923,799

(22) Filed: Oct. 25, 2007

(65) Prior Publication Data

US 2008/0144630 A1    Jun. 19, 2008

(30) Foreign Application Priority Data

Dec. 14, 2006  (JP)  .............................. 2006-337457

(51) Int. Cl.
  *H04W 4/00*   (2009.01)
  *H04L 12/50*  (2006.01)
  *H04L 12/28*  (2006.01)
  *H04J 3/12*   (2006.01)

(52) U.S. Cl. .................. 370/328; 370/410; 370/522

(58) Field of Classification Search ................ 370/328, 370/384, 410, 420, 522; 379/221.03
  See application file for complete search history.

(56) References Cited

U.S. PATENT DOCUMENTS 7,406,324 B1 *    7/2008  McConnell ................. 455/466
2006/0045043 A1 *  3/2006  Crocker et al. .............. 370/328

FOREIGN PATENT DOCUMENTS

JP    2002-320261    10/2002
WO   WO 02/067533  *  8/2002

\* cited by examiner

*Primary Examiner*—Chirag G Shah
*Assistant Examiner*—Jenkey Van
(74) *Attorney, Agent, or Firm*—Katten Muchin Rosenman LLP

(57) ABSTRACT

A call management method makes a call management system perform a process of releasing resources that are secured for a terminal device that has become a communication disable state among resources in the call management system that are secured for each of the terminal devices under speech communication (#103 and #108), and sending a message for finishing speech communication to a terminal device on the other end of the speech communication without transmitting it to the terminal device that has become a communication disable state (#112), when it is detected that one of the terminal devices under speech communication with each other has become a communication disable state in a mobile communication network (#102).

3 Claims, 12 Drawing Sheets

FIG. 4

| Message | To | From | ID | Via 1-n | Route | Flag |
|---------|----|----|----|---------|-------|------|

FIG. 6

| | (Message) | (To) | (From) | (ID) | (Via) | (Route) | (Flag) |
|---|---|---|---|---|---|---|---|
| MS1 | BYE | TR2 | TR1 | 5 | AS | SIP | 1 |

| | (Message) | (To) | (From) | (ID) | (Via2) | (Via1) |
|---|---|---|---|---|---|---|
| MS2 | BYE | TR2 | TR1 | 5 | SIP | AS |
| MS3 | 200OK | TR2 | TR1 | 5 | SIP | AS |

| | (Message) | (To) | (From) | (ID) | (Via1) |
|---|---|---|---|---|---|
| MS4 | 200OK | TR2 | TR1 | 5 | AS |

| | (Message) | (To) | (From) | (ID) | (Via1) | (Route) | (Flag) |
|---|---|---|---|---|---|---|---|
| MS5 | BYE | TR1 | TR2 | 5 | AS | SIP | 0 |

| | (Message) | (To) | (From) | (ID) | (Via2) | (Via1) |
|---|---|---|---|---|---|---|
| MS6 | BYE | TR1 | TR2 | 5 | SIP | AS |
| MS7 | 200OK | TR1 | TR2 | 5 | SIP | AS |

| | (Message) | (To) | (From) | (ID) | (Via1) |
|---|---|---|---|---|---|
| MS8 | 200OK | TR1 | TR2 | 5 | AS |

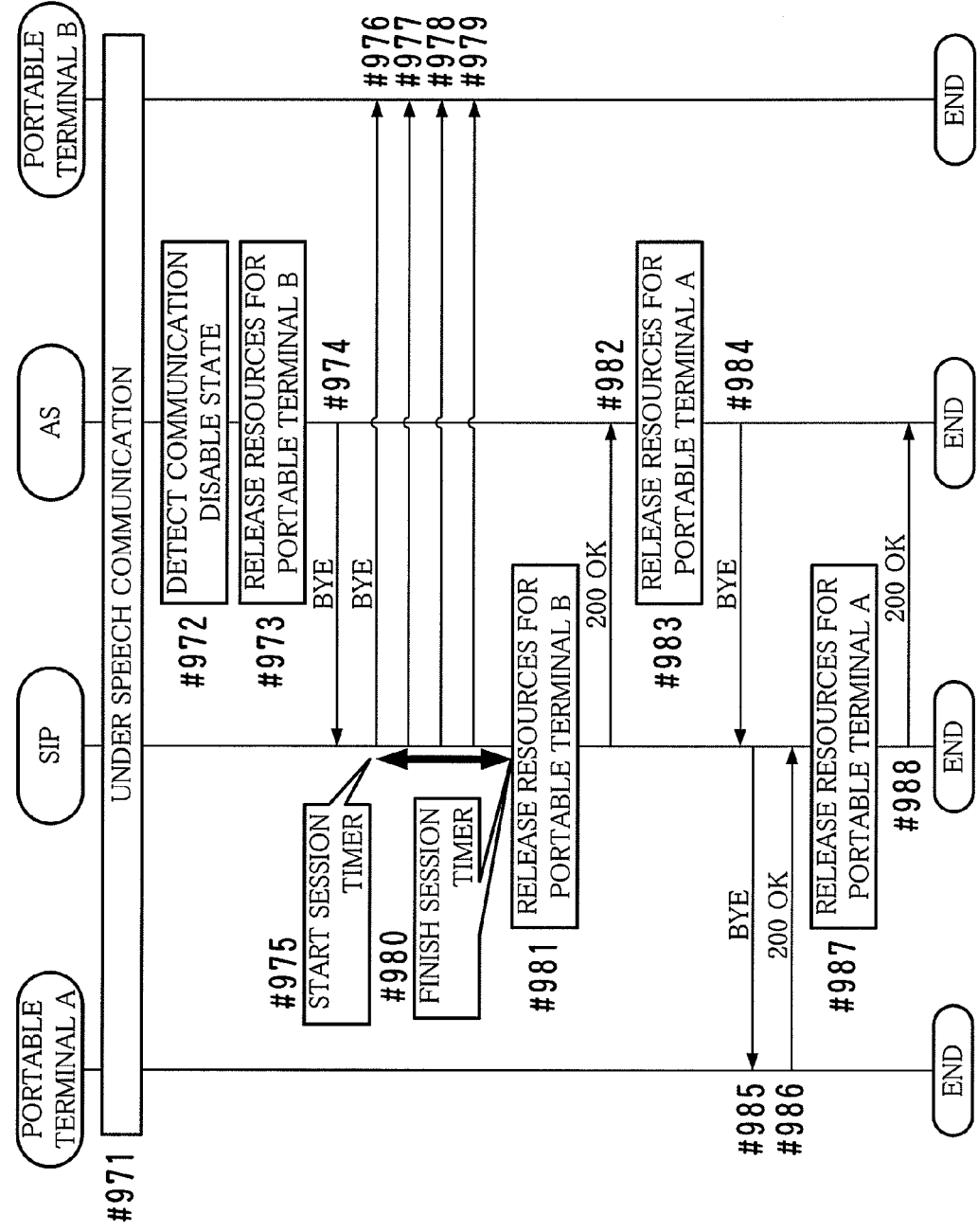

CALL MANAGEMENT METHOD, CALL MANAGEMENT SYSTEM AND MESSAGE PROCESSING SERVER SYSTEM

BACKGROUND OF THE INVENTION

1. Field of the Invention

The present invention relates to a method, a system and the like concerning call control of a mobile communication network.

2. Description of the Prior Art

At present, there are widely available mobile communication services using portable terminals such as cellular phones or mobile phones. In the mobile communication, portable terminals can communicate each other via a relay device that is called a base station. Wireless communication is performed between the portable terminal and the base station. An area in which the portable terminal can communicate with the base station depends on the base station. If the portable terminal moves to the outside of the area, i.e., the outside of the communication area, the portable terminal has become a communication disable state. Although the mobile communication may be used as data communication, it is mainly used for audio communication (speech communication) by a telephone service in many cases. As a technique for improving convenience of such mobile communication, there is proposed a method as disclosed in Japanese unexamined patent publication No. 2002-320261, for example.

In the telephone service, a telephone set calls another telephone set on the other end, and the called side responds to the call so that speech communication can be realized between them. In the telephone service, this action making a state where speech communication is possible is referred to as "call establishment" or "audio path establishment" or the like. In other words, the call establishment enables start of speech communication. In addition, when the established call is disconnected (or finished), the speech communication is finished. Control concerning the call establishment and the disconnection is usually referred to as "call control" or "signaling" or the like.

Recently, a telephone service that is called an IP phone using a protocol of the Internet is used in many situations. The IP phone is a type of telephone services for speech communication via an IP network (IP phone network) that is made up of the Internet or an intranet or the like.

The IP phone uses a protocol that is called SIP (Session Initiation Protocol) for call control. The SIP is a protocol defined by RFC3261 or the like. According to the SIP, various types of message concerning call control are exchanged between portable terminals in order that call establishment or disconnection is made. Hereinafter, this message may be referred to as an "SIP message" in the description.

Here, a conventional process flow for establishing call by the SIP will be described with reference to FIG. 8. "SIP" in FIG. 8 indicates an "SIP server" that is a server performing call control by the SIP.

When a user dials the number of the other side of speech communication by using his or her portable terminal (referred to as a "portable terminal A"), the portable terminal A transmits an SIP message of "INVITE" to a portable terminal on the other end (referred to as a "portable terminal B") (#901). This INVITE is an SIP message for requesting a call establishment.

The SIP server usually has a function as a proxy server, and it relays and transmits the SIP message to a destination, which is exchanged between devices such as portable terminals. The SIP server relays the INVITE transmitted in the step #901, by the function as the proxy server, so that the INVITE is transmitted to the portable terminal B on the other end (#903).

When it is relayed, the SIP server sends the SIP message of "100 Trying", which indicates that the INVITE is received, to the portable terminal A (#902).

When the portable terminal B receives the INVITE, it transmits the "100 Trying" to the SIP server first (#904). Then, it transmits the SIP message of "180 Ringing", which indicates that the user is being called, to the portable terminal A (#905). The SIP server relays the "180 Ringing" and transmits it to the portable terminal A (#906).

When a user of the portable terminal B responds to the call, the portable terminal B transmits the SIP message of "200 OK" to the portable terminal A (#907). The "200 OK" is the SIP message indicating that the procedure (or the process) is successful and means a response to the INVITE in this case. The SIP server relays the "200 OK" and transmits it to the portable terminal A (#908).

Note that in the SIP the portable terminal that issues the SIP message such as the INVITE for a request (the portable terminal A in this case) may be referred to as a UAC (User Agent Client). In addition, the portable terminal that responds to the SIP message (the portable terminal B in this case) may be referred to as a UAS (User Agent Server).

When the portable terminal A receives the "200 OK", it transmits the SIP message of "ACK" for confirming that the call establishment is completed to the portable terminal B (#909). The SIP server relays the "ACK" and transmits it to the portable terminal B (#910). By the process described above, call establishment is performed between the portable terminals A and B. Thus, speech communication can be started.

When the speech communication is finished and one of the users does an operation for disconnecting the connection, a process for disconnecting the call (a disconnection process) is started. Here, a conventional process flow of disconnecting the call will be described with reference to FIG. 9. Note that it is supposed that the user of the portable terminal A does the operation for the disconnecting the connection.

When the user does the operation for the disconnecting the telephone, the portable terminal A transmits the SIP message of "BYE" to the portable terminal B (#922). The "BYE" is the SIP message for requesting disconnection (end) of the call.

The SIP server relays the "BYE" and transmits it to the portable terminal B (#924). In addition, in parallel with it or before or after it, resources that had been secured for the process for the portable terminal A in the call control are released (#923)

When the portable terminal B receives the "BYE", it transmits the "200 OK" to the portable terminal A (#925). The SIP server relays the "200 OK" and transmits it to the portable terminal A (#927). In addition, in parallel with it or before or after it, resources that had been secured for the process for the portable terminal B in the call control are released (#926). When the portable terminal A receives the "200 OK", the process of disconnecting the call (a release process) is completed.

In addition, the call control may be performed in cooperation between the SIP server and an application server that provides an application program concerning a service such as the IP phone, a videoconference or the like using the IP network. FIG. 10 shows a conventional process flow of call disconnection using the application server. Note that "AS" in FIG. 10 indicates the application server.

When the application server is used, the portable terminal A transmits the "BYE" to the application server via the SIP server (#932 and #933 in FIG. 10). The application server that has received the "BYE" releases resources that have been secured when the call establishment was performed (#934 and #938), and it transmits the "BYE" for informing that the call will be finished to the portable terminal B via the SIP server (#939)

In the mobile communication, if one of the portable terminals that are doing speech communication moves to the outside of the communication area or due to other factor, a communication disable state may occur. Then, the application server detects the communication disable state, and the call disconnection process is started. FIG. 11 shows the conventional process flow of the call disconnection when a communication disable state is detected. In this case, after the application server detects a communication disable state, the application server transmits the "BYE" to both the portable terminals (#954 and #960).

The IP phone performs the call establishment and the disconnection process in the procedure as shown in FIGS. 8-11, so that speech communication between the portable terminals is realized.

However, there is a case where there is no response to the SIP message that has been transmitted from the SIP server to the portable terminal due to a certain factor. In this case, the SIP server cannot do a process to be performed subsequently to the response. Therefore, in the conventional method, the SIP server retransmits the SIP message to the portable terminal for requesting a response again as shown in FIG. 12. If the retransmission is repeated for a predetermined time period and there is no response from the portable terminal, a process to be performed after the response is started.

However, in the conventional method described above, if a response ("200 OK") is not returned concerning the "BYE" that was transmitted from the SIP server to the portable terminal, the next process cannot be started promptly. As a result, release of resources is delayed. In this case, use efficiency of the SIP server is lowered. In addition, if the retransmission of the SIP message to the portable terminal is repeated, it will cause an increase of traffic.

SUMMARY

An object of the present invention is to suppress an increase of useless traffic and to improve use efficiency of the SIP server compared with the conventional method.

A call management method according to one aspect of the present invention is a call management method in a call management system that is used for a mobile communication network, and it includes the steps of detecting that one of terminal devices under speech communication with each other has become a communication disable state, releasing resources secured for the terminal device that has become a communication disable state among resources in the call management system that are secured for each of the terminal devices under the speech communication, and transmitting a message for finishing the speech communication not to the terminal device that has become a communication disable state but to the terminal device on the other end of the speech communication.

Note that the "under speech communication" means a state in which call is established. The "finishing the speech communication" means disconnecting the call established for the speech communication.

According to the present invention, an increase of useless traffic can be suppressed, and use efficiency of the SIP server can be improved compared with the conventional method.

BRIEF DESCRIPTION OF THE DRAWINGS

FIG. 4 is a diagram showing an example of a structure of message data.

FIG. 6 is a diagram for explaining message data that is exchanged in the disconnection process shown in FIG. 5.

FIG. 12 is a block diagram for explaining a flow of a conventional call disconnection process by detecting a communication disable state.

DESCRIPTION OF THE PREFERRED EMBODIMENTS

The invention will now be described in detail with reference to the attached drawings.

Figure 1:
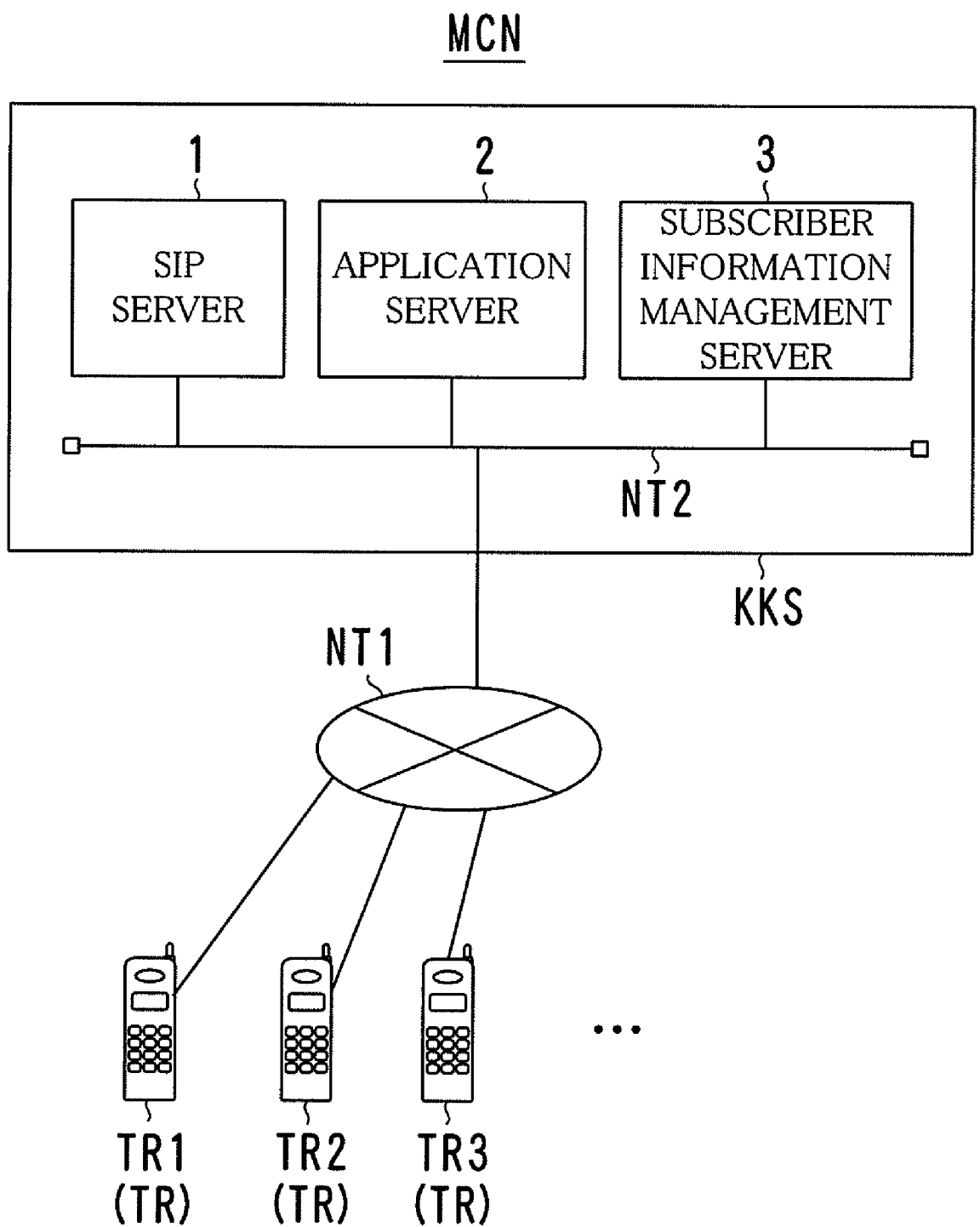
FIG. 1 is a diagram showing an example of a general structure of a mobile communication network according to the present invention.
Figure 2:
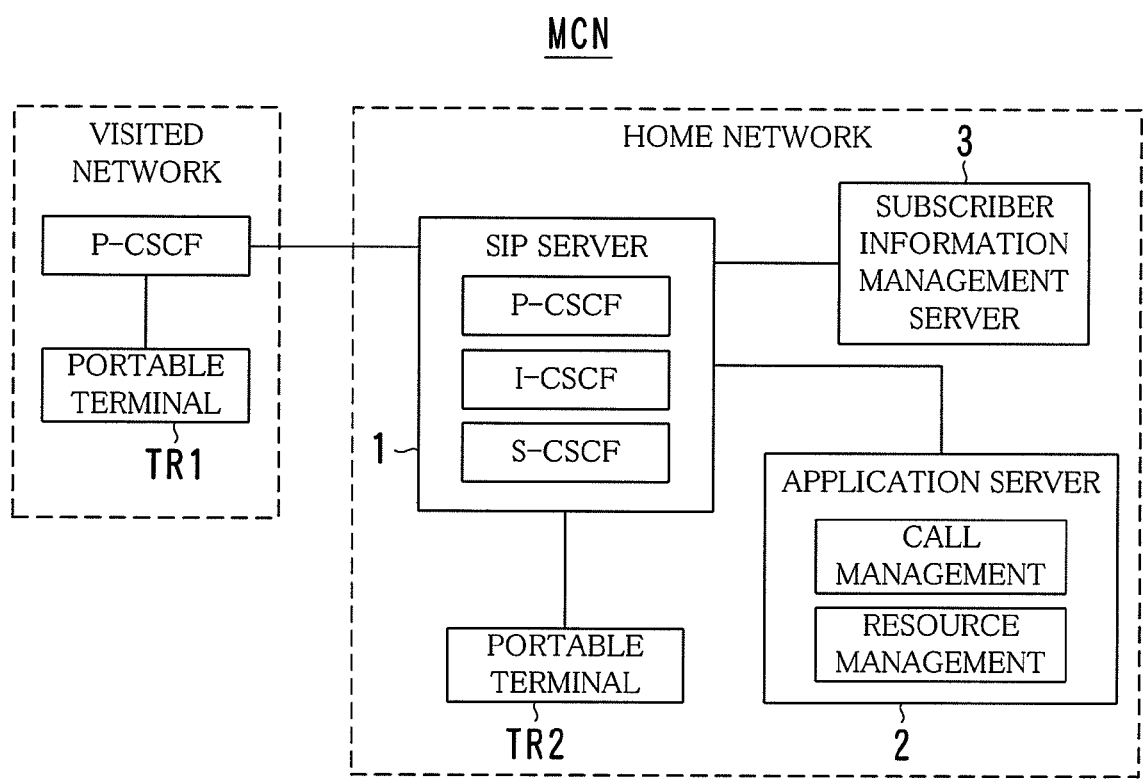
FIG. 2 is a block diagram showing the mobile communication network in the case of focusing attention on CSCF.

FIG. 1 is a diagram showing an example of a general structure of a mobile communication network MCN according to the present invention, and FIG. 2 is a block diagram showing the mobile communication network MCN in the case of focusing attention on CSCF.

The mobile communication network MCN according to an embodiment of the present invention is a network for providing a user with a service of mobile communication, and it is made up of a call management system KKS, portable terminals TR1, TR2 and so on, a communication network NT1 and the like as shown in FIG. 1. Hereinafter, the portable terminals TR1, TR2 and so on may be generically referred to as "portable terminal TR." Other reference signs may also be referred to in the same manner by omitting serial numbers as suffixes.

The call management system KKS and the portable terminals TR are connected to each other via the communication network NT1. The communication network NT1 can be the Internet or an intranet or the like, and it may be called an "IP network" or the like.

The portable terminal TR can be a mobile phone or a PDA. A user who subscribes to a mobile communication service of the mobile communication network MCN can enjoy an IP phone service by the mobile communication using his or her portable terminal TR.

When the user dials the number of the other side of speech communication by using his or her portable terminal TR, a process for establishing a session (connection) called a "call"

between the portable terminal TR and the other portable terminal TR is started. The call establishment enables to start the speech communication. In addition, call disconnection (termination) finishes the speech communication. The control about call establishment and disconnection in the present embodiment (call control) is performed based on a protocol for call control in the IP phone, the videoconference or the like, which is called an SIP (Session Initiation Protocol).

The call management system KKS is a system for managing a call established between the portable terminals TR. The call management system KKS is made up of an SIP server 1, an application server 2, a subscriber information management server 3, and a communication network NT2 and the like.

The SIP server 1, the application server 2 and the subscriber information management server 3 are connected to each other via the communication network NT2. The communication network NT2 can be a LAN, a WAN, the Internet, an intranet, a private line or the like.

The application server 2 provides an application about a service such as a videophone and manages resources for the service. It has a function of detecting a communication disable state of the portable terminal TR when it occurs for a certain factor during communication by using RTP (Real-time Transport Protocol) or the like. This detection is performed by a known method.

The subscriber information management server 3 manages information of users who signed up to the service of mobile communication provided by the mobile communication network MCN. It may be called an HSS (Home Subscriber Server) or the like.

The SIP server (call control management server) 1 is a server that assists the call control based on the SIP. The SIP server 1 manages information such as IP addresses and the like of the portable terminals TR and works as a proxy server using the information. In other words, it relays various SIP messages that are exchanged between the portable terminals TR or between the portable terminal TR and the application server 2 and transmits the messages for the transmitter. In the present embodiment, exchange of the SIP messages is performed by using the message data MS (see FIGS. 3 and 4) including the SIP message. Contents of the message data MS will be described later in detail.

In addition, the SIP server 1 assigns a call number for identifying a call to the call to be established. The call is usually established at the number of combinations of the portable terminals TR that are under speech communication. Each of these calls can be identified by the call number that is assigned to it. It is possible to adopt a structure in which the application server 2 assigns the call numbers.

The SIP server 1 is provided with an SIP software switch for realizing functions such as a data transmission and reception portion (UDP communication control portion) 101, a call control portion 102, a message discriminating portion (message distributing portion) 103 and the like that will be described later. A plurality of processors (CPUs) that are referred to as call process processors or the like perform the function such as the call control portion 102, the message discriminating portion 103 and the like. The call process processor is a processor that is assigned for the call process and performs only the call process. Note that the SIP software switch has various other functions such as maintenance and the like.

Furthermore, the SIP server 1 has a call control function that is called a "CSCF (Call Session Control Function)." This CSCF includes "P-CSCF", "S-CSCF" and "I-CSCF." The P-CSCF (Proxy-CSCF) is a function of transferring the message (SIP message) received from the portable terminal TR to other CSCF. It also performs address management of the portable terminal TR. The S-CSCF (Serving-CSCF) is a function for performing service management that is provided to the portable terminal TR. The I-CSCF (Interrogate-CSCF) is a function of selecting the S-CSCF.

Focusing attention on this CSCF, the mobile communication network MCN can be shown by the block diagram as shown in FIG. 2. FIG. 2 shows the portable terminal TR1 as a transmitting side and the portable terminal TR2 as a receiving side. As shown in FIG. 2, the portable terminal TR1 is connected to the network (Home Network) of the receiving side via the P-CSCF of the network (Visited Network) of the transmitting side. The SIP message transmitted from the portable terminal TR1 is received by the portable terminal TR2 or the like via the P-CSCF, the I-CSCF, the S-CSCF of the SIP server 1 and the like.

Figure 8:
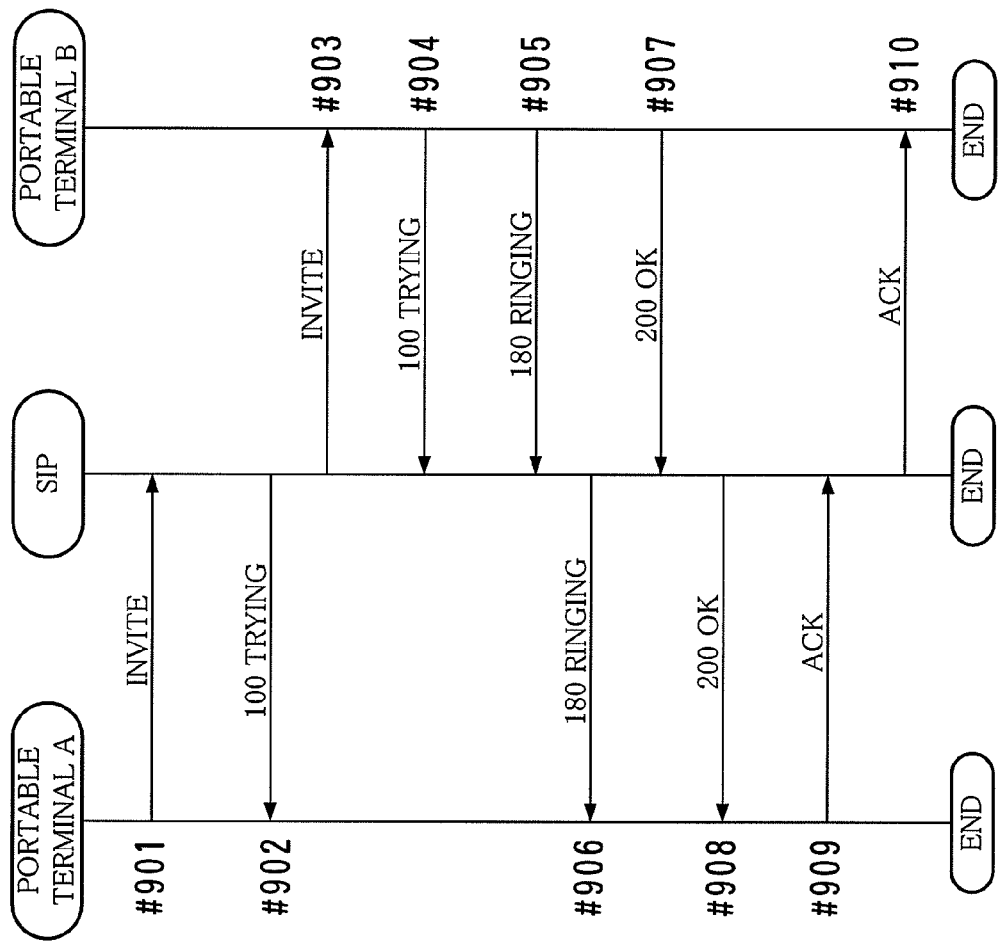
FIG. 8 is a diagram for explaining a process flow of call establishment according to the conventional method.

When a user dials the number of the other side to whom he or she wants to talk by using his or her portable terminal TR, the SIP server 1 or the like performs a process for establishing the call. This process is performed by the conventional method as shown in FIG. 8, for example. When the call is established between the portable terminals TR, speech communication between the portable terminals TR is started.

Figure 9:
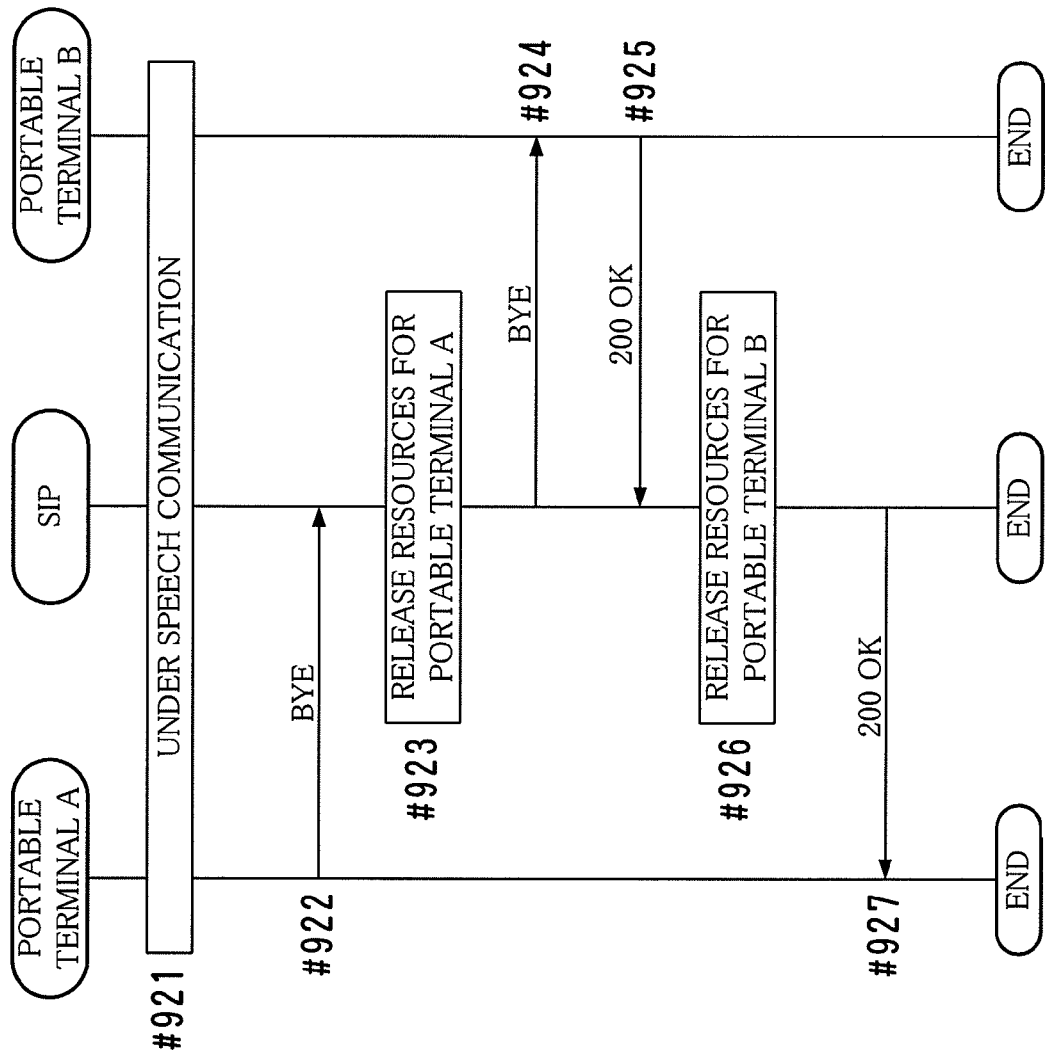
FIG. 9 is a diagram for explaining a flow of a call disconnection process according to the conventional method.
Figure 10:
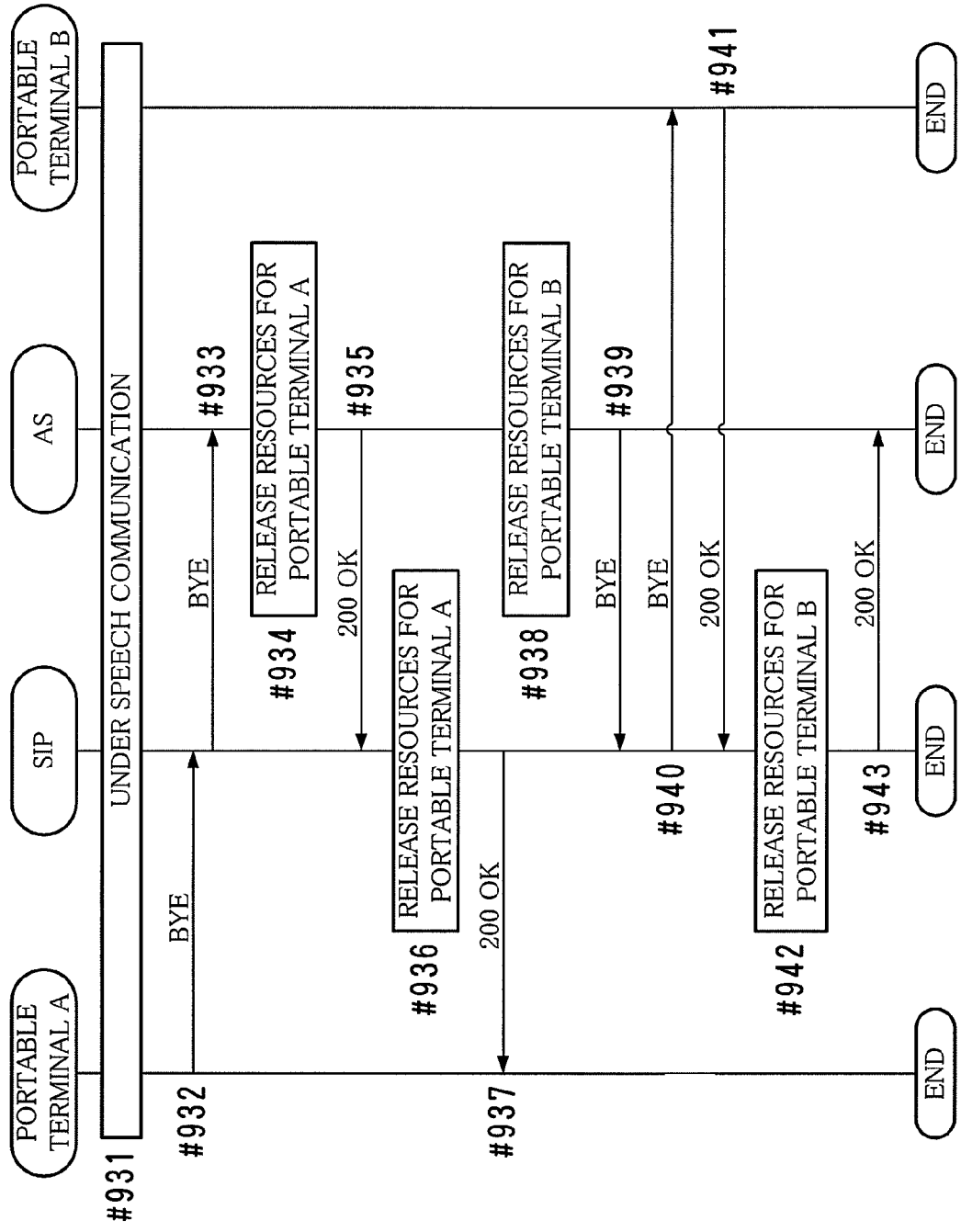
FIG. 10 is a diagram for explaining a flow of a conventional call disconnection process performed by the SIP server and the application server.

When one of the users who are speaking does an operation for hanging up the telephone (an operation for finishing the speech communication), the SIP server 1 or the like performs the process for disconnecting (finishing) the call (disconnection process). This process is performed by the conventional method as shown in FIG. 9 or 10.

In addition, the portable terminal TR under speech communication may become a communication disable state when it moves to the outside of the communication area or power supply is turned off. In this case, it is necessary that the SIP server 1 or the application server 2 or the like perform the call disconnection process automatically so that release of the resources that were secured when the call was established can be done normally. In the present embodiment, if the portable terminal TR under speech communication becomes a communication disable state, the application server 2 detects the state so that the call disconnection process is performed based on it.

Figure 3:
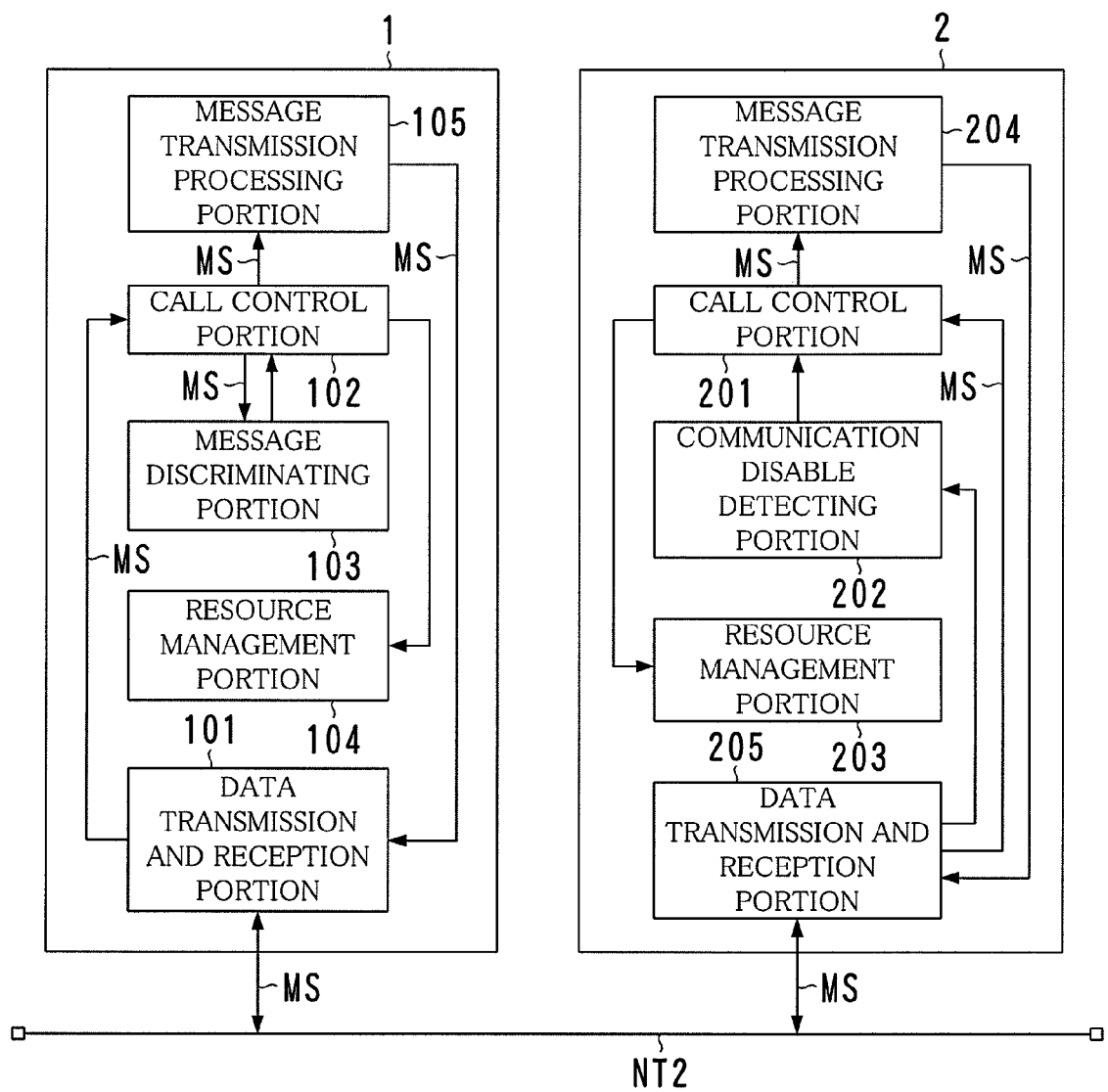
FIG. 3 is a diagram showing an example of a functional structure of an SIP server and an application server.
Figure 4:
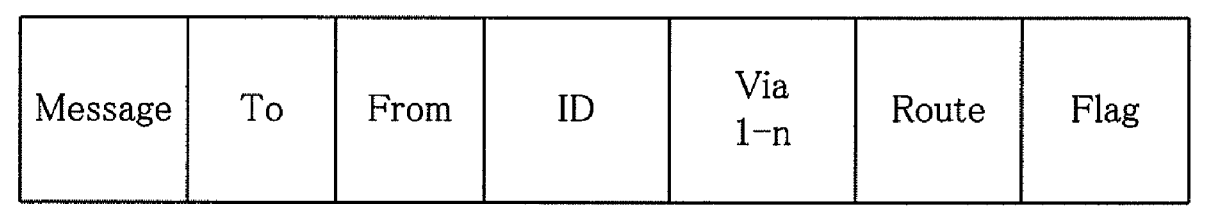

FIG. 3 is a diagram showing an example of a functional structure of the SIP server 1 and the application server 2, FIG. 4 is a diagram showing an example of a structure of the message data MS.

As shown in FIG. 3, the SIP server 1 is made up of the data transmission and reception portion 101, the call control portion 102, the message discriminating portion 103, a resource management portion 104, a message transmission processing portion 105 and the like. The application server 2 is made up of a call control portion 201, a communication disable detecting portion 202, a resource management portion 203, a message transmission processing portion 204, a data transmission and reception portion 205 and the like.

Programs and data for realizing the functions are installed in a storage device such as a hard disk in each of the SIP server 1 and the application server 2. The programs and data are read out to a memory as necessity, and the programs are executed by the CPU.

In the present embodiment, exchange of message data MS including the SIP message is performed between devices when the call is established or disconnected.

The data transmission and reception portion 101 has a management function and the like of the transmission and reception and a transmission and reception port of a UDP (User Datagram Protocol) signal, so as to receive the message data MS transmitted from other devices and to transmit the message data MS to other devices.

The call control portion 102 of the SIP server 1 gives instructions for the call control to the message discriminating portion 103, the resource management portion 104, the message transmission processing portion 105 and the like based on the message data MS that was transmitted to the SIP server 1.

The message discriminating portion 103 performs discrimination about types or the like of the message data MS that was transmitted to the SIP server 1 and informs the call control portion 102 about a result of the discrimination.

The resource management portion 104 performs a process for the call control, in which resources are secured or the secured resources are released for each of the portable terminals TR. More specifically, it performs adding or deleting of user data, and securing or releasing of memory, for example.

The message transmission processing portion 105 performs a process for generating the message data MS and transmitting the same based on instructions from the call control portion 102. In other words, it instructs the data transmission and reception portion 101 to transmit the generated message data MS.

As shown in FIG. 4, the message data MS includes items of "Message", "To", "From", "ID", "Via", "Route", "Flag" and the like.

"Message" indicates which of the SIP message the message data MS is related to. More specifically, it indicates the SIP message such as "BYE", "200 OK" or the like.

"To" indicates the portable terminal TR that is a destination (logical destination) of the message data MS. "From" indicates the portable terminal TR on the other end of the communication for the portable terminal TR that is indicated in "To". The portable terminal TR indicated here means a logical transmitter of the message MS. "ID" indicates the call number of the call in which the message data MS is exchanged. "Via" indicates a device through which the message data MS passed. If a plurality of devices are indicated as "Via" like "Via1", "Via2" and so on in the message data MS, it means that the message data MS passed through the plurality of devices. Note that "Via1" indicates the device that transmits the message data MS first.

"Route" indicates a proxy server that relays the message data MS first. "Flag" indicates a value that tells whether or not the message data MS is the message data MS transmitted based on the detection of a communication disable state, i.e., the message data MS that indicates a start of the call disconnection process based on a communication disable state. If the value indicated here is "1", it means that the message data MS is the message data MS that is transmitted based on the detection of a communication disable state. If it is "0", it means that the message data MS is not the message data MS that is transmitted based on the detection of a communication disable state, i.e., that the message data MS is, for example, one that is transmitted in the disconnection process based on a termination operation by the user. Note that "To", "From", "Via" and "Route" actually indicate a name or an IP address or the like of the corresponding device.

The call control portion (call processing portion) 201 of the application server 2 gives instructions for call control in cooperation with the SIP server 1 to the message transmission processing portion 204, the resource management portion 203 and the like based on the message data MS and the like that were transmitted to the application server 2.

The communication disable detecting portion (outside detecting portion) 202 detects a communication disable state of the portable terminal TR under speech communication when it moves to the outside of the communication area or its power is turned off. This detection is performed by a known method.

The resource management portion 203 performs a process for securing resources or releasing the secured resource for each of the portable terminals TR for the call control. More specifically, it performs adding or deleting of user data, and securing or releasing of memory, for example.

The message transmission processing portion 204 performs a process for generating the message data MS and transmitting the same based on instructions from the call control portion 201. In other words, it instructs the data transmission and reception portion 205 to transmit the generated message data MS.

The data transmission and reception portion 205 performs a process for receiving message data MS that is transmitted from other device or transmitting message data MS to other device.

Figure 5:
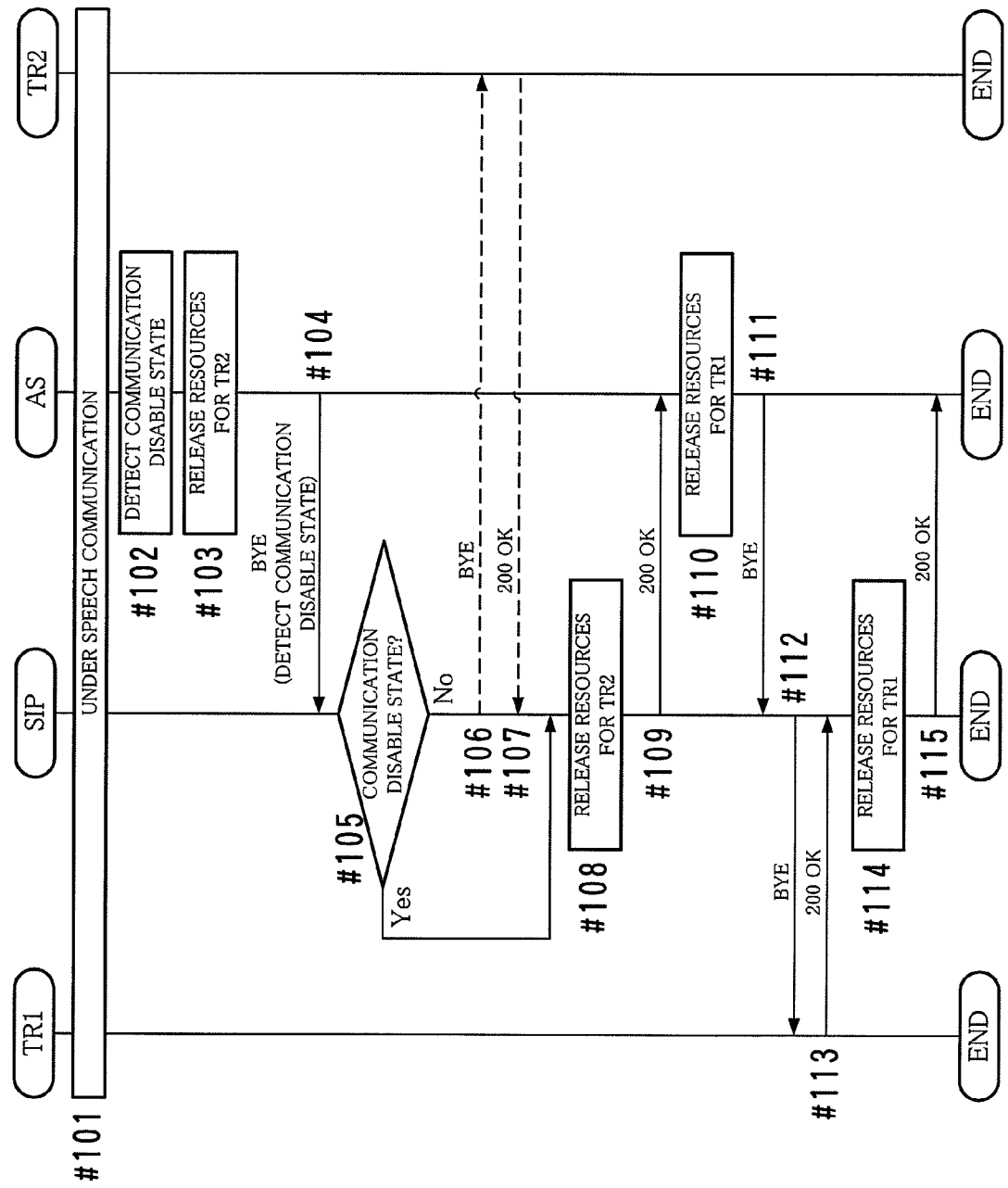
FIG. 5 is a diagram for explaining a flow of a call disconnection process by detecting a communication disable state.

FIG. 5 is a diagram for explaining a flow of a call disconnection process by detecting a communication disable state, and FIG. 6 is a diagram for explaining message data MS that is exchanged in the disconnection process shown in FIG. 5. When the portable terminal TR under speech communication moves to the outside of communication area or its power is turned off, it becomes a communication disable state. The communication disable detecting portion 202 of the application server 2 detects the state, and the call disconnection process is started. Processes of individual portions of the SIP server 1 and the application server 2 when the disconnection process is performed will be described with reference to FIG. 5.

When the portable terminal TR2 becomes a communication disable state because it moves the outside of the communication area or other reason while the portable terminal TR1 and the portable terminal TR2 are under speech communication (#101), the communication disable detecting portion 202 of the application server 2 detects that the portable terminal TR2 has become a communication disable state (#102), and it informs the call control portion 201 of the fact. Then, the call control portion 201 starts the disconnection process of the call (of the call number "5") in which the portable terminal TR2 participates.

In this disconnection process, the resource management portion 203 is instructed to release resources that were secured for performing the process about the portable terminal TR2 in the call control. The resource management portion 203 performs the releasing process of resources based on the instructions (#103).

In parallel with this, or before or after this, the call control portion 201 instructs the message transmission processing portion 204 to transmit the message data MS including "BYE" that is the SIP message indicating that a communication disable state is detected and that the call disconnection process is started to the portable terminal TR2 that is a portable terminal that has become a communication disable state. The message transmission processing portion 204 first generates the message data MS1 as shown in FIG. 6 based on the instructions.

In this message data MS1, the item of "Message" indicates "BYE", the item of "To" indicates information of the portable terminal TR2 that is the destination (that is referred to as "TR2" in the drawing), the item of "From" indicates information of the portable terminal TR1 that is the other end of the speech communication (referred to as "TR1" in the drawing), the item of the "ID" indicates the call number of "5". In addition, the item of "Via1" indicates information of the application server 2 that is a transmitter of the message data MS (referred to as "AS" in the drawing). The item of "Route" indicates information of the SIP server 1 that is a proxy server that relays the message data MS first (referred to as "SIP" in the drawing). "Flag" indicates "1" that is a value indicating that the message data MS is to be transmitted when a communication disable state is detected. In the case of the message data MS about "BYE" indicating that a communication disable state is detected, the portable terminal that is indicated in the item of "To" means the portable terminal that has become a communication disable state.

Then, the message transmission processing portion 204 transmits the generated message data MS1 to the SIP server 1. In other words, it instructs the data transmission and reception portion 205 to transmit the message data MS1 (#104).

The transmitted message data MS1 is relayed by the SIP server 1 and is transmitted to the portable terminal TR2 of the destination from there. When the relay is performed, the SIP server 1 receives the message data MS1 by the data transmission and reception portion 101.

The call control portion 102 of the SIP server 1 instructs the message discriminating portion 103 to discriminate the message data MS1 received by the data transmission and reception portion 101.

Then, the message discriminating portion 103 first refers to the contents of the "Message" of the message data MS1 based on the instructions and discriminates which of the SIP messages the message data MS1 is related to. Further, if it is determined that it is related to "BYE", a value indicated in "Flag" is referred to. Then, it is determined whether or not the message data MS1 is the one that was transmitted when a communication disable state had been detected. By this determination, the transmitted message data MS1 are divided into message data MS indicating "BYE" that was transmitted when a communication disable state had been detected and other message data MS.

Here, the contents of "Message" of the message data MS1 is "BYE" and a value of "Flag" is "1", so it is determined that the message data MS1 is the message data MS about "BYE" that was transmitted when a communication disable state had been detected (Yes in #105). Then, a result of the discrimination is sent to the call control portion 102.

Figure 11:
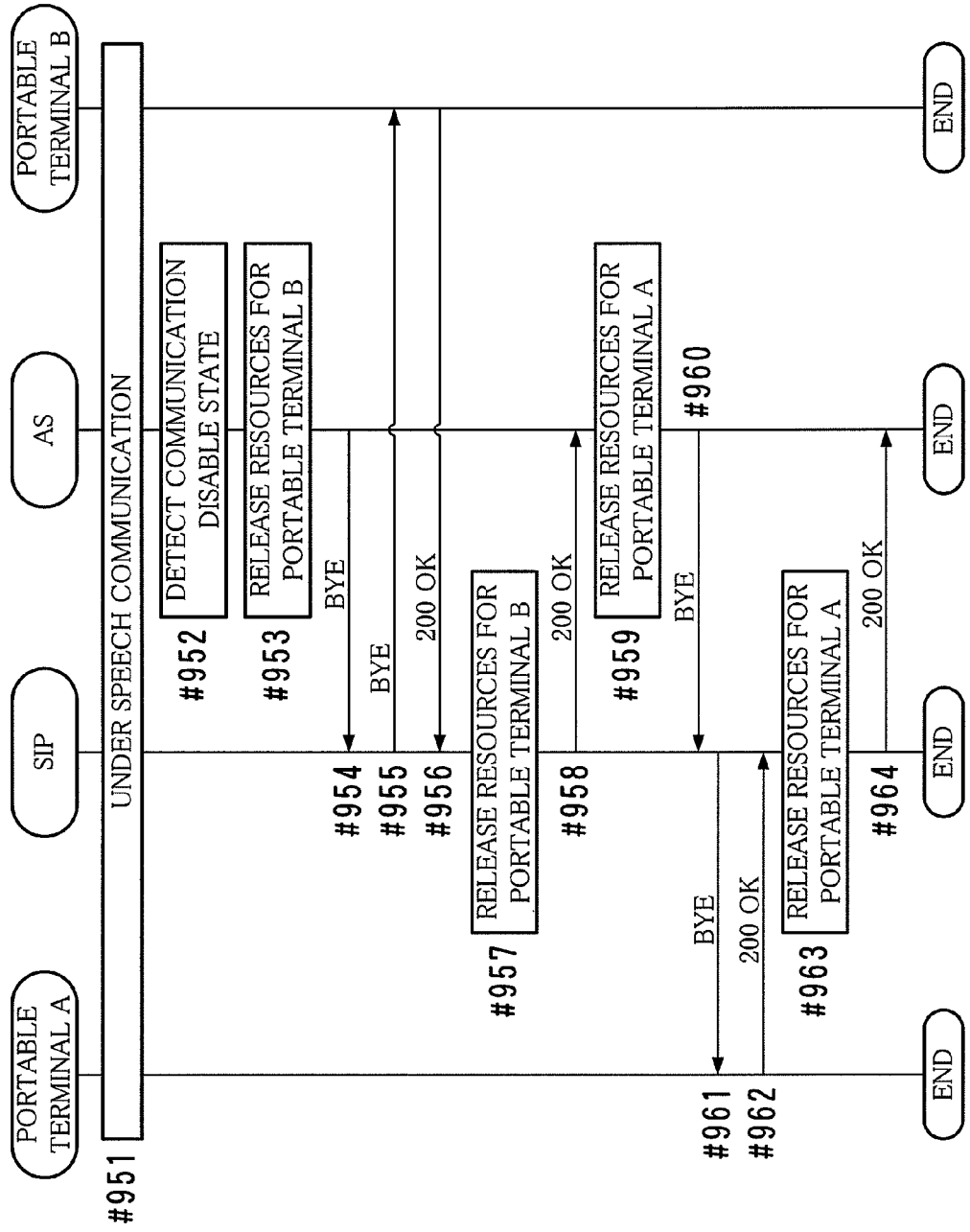
FIG. 11 is a diagram for explaining a flow of a conventional call disconnection process by detecting a communication disable state.

If a value of the "Flag" is "0", the message discriminating portion 103 determines that the message data MS1 is not the one that was transmitted when a communication disable state had been detected, but it is the message data MS about "BYE" (No in #105), and the determination result is sent to the call control portion 102. In this case, the call control portion 102 instructs the message transmission processing portion 105 to transmit the message data MS about "BYE" to the portable terminal TR2 that is the destination. Then, the message transmission processing portion 105 adds the item of "Via2" to the message data MS1, stores the information indicating the SIP server 1, deletes the items of "Route" and "Flag", and generates message data MS2 as shown in FIG. 6. Then, it sends them to the portable terminal TR2 (#106). The portable terminal TR2 gives message data MS3 about "200 OK" indicating acknowledgement to "BYE" indicated in the message data MS2 (#107). After that, the process of the step #108 and subsequent steps is performed. The call disconnection process is performed by the conventional method (see step #957 and subsequent steps in FIG. 11).

The determination result indicating that it is the one that was transmitted when a communication disable state had been detected is sent, the call control portion 102, as shown in the step #106, instructs the message transmission processing portion 105 not to transmit "BYE" to the portable terminal TR2 that became a communication disable state (the portable terminal indicated in "To" of the message data MS1) but to transmit "200 OK" to the application server 2. Then, the message transmission processing portion 105 first changes "Message" of the message data MS1 to "200 OK", deletes the items of "Route" and "Flag", and generates message data MS4 as shown in FIG. 6.

After generating the message data MS4, the message transmission processing portion 105 transmits it to the application server 2. In other words, it instructs the data transmission and reception portion 101 to transmit the message data MS4 (#109).

In addition, in parallel with this, or before or after this, the call control portion 102 instructs the resource management portion 104 to release resources that were secured for performing the process for the portable terminal TR2 in the call control. The resource management portion 104 releases the resources based on the instructions (#108).

The data transmission and reception portion 205 of the application server 2 receives the message data MS4 transmitted in the step #109. The call control portion 201 receives the message data MS4 that was received by the data transmission and reception portion 205 and instructs the message transmission processing portion 204 to transmit "BYE" to the portable terminal TR1. Then, the message transmission processing portion 204 first generates message data MS5 about "BYE" as shown in FIG. 6 by using the message data MS4 and transmits it to the SIP server 1 (#111).

In addition, in parallel with this, or before or after this, the call control portion 201 instructs the resource management portion 203 to release resources that were secured for performing the process for the portable terminal TR1 in the call control. The resource management portion 203 releases the resources based on the instructions (#110).

When the data transmission and reception portion 101 of the SIP server 1 receives the message data MS5, the call control portion 102 instructs the message discriminating portion 103 to discriminate the message data MS5. The message discriminating portion 103 performs discrimination in accordance with the instructions and sends a result of the discrimination to the call control portion 102. Here, of course, the call control portion 102 is informed that the message data MS5 is the message data MS about "BYE" that is not the one that was transmitted when a communication disable state had been detected.

After receiving the information, the call control portion 102 instructs the message transmission processing portion 105 to transmit "BYE" to the portable terminal TR1 indicated as a destination in the item of "To" of the message data MS5.

The message transmission processing portion 105 generates message data MS6 as shown in FIG. 6 by using the message data MS5 and sends it to the portable terminal TR1 (#112).

After receiving the message data MS6, the portable terminal TR1 generates message data MS7 as shown in FIG. 6 about "200 OK" and transmits it to the SIP server 1 (#113). The data transmission and reception portion 101 of the SIP server 1 receives the message data MS7. The call control portion 102 instructs the message discriminating portion 103 to discriminate the message data MS7 that the data transmission and reception portion 101 received. The message discriminating portion 103 performs discrimination in accordance with the instructions and sends a result of the discrimination to the call control portion 102. Here, of course, the call control portion 102 is informed that the message data MS7 is the message data MS that indicates "200 OK". The call control portion 102 instructs the message transmission processing portion 105 to transmit "200 OK" to the application server 2.

Then, the message transmission processing portion 105 first generates message data MS8 as shown in FIG. 6 by using the message data MS7. Then, it is transmitted to the application server 2 (#115).

In addition, in parallel with this, or before or after this, the call control portion 102 instructs the resource management portion 104 to release resources that were secured for performing the process about the portable terminal TR1 in the call control. The resource management portion 104 releases the resources in accordance with the instructions (#114).

Figure 7:
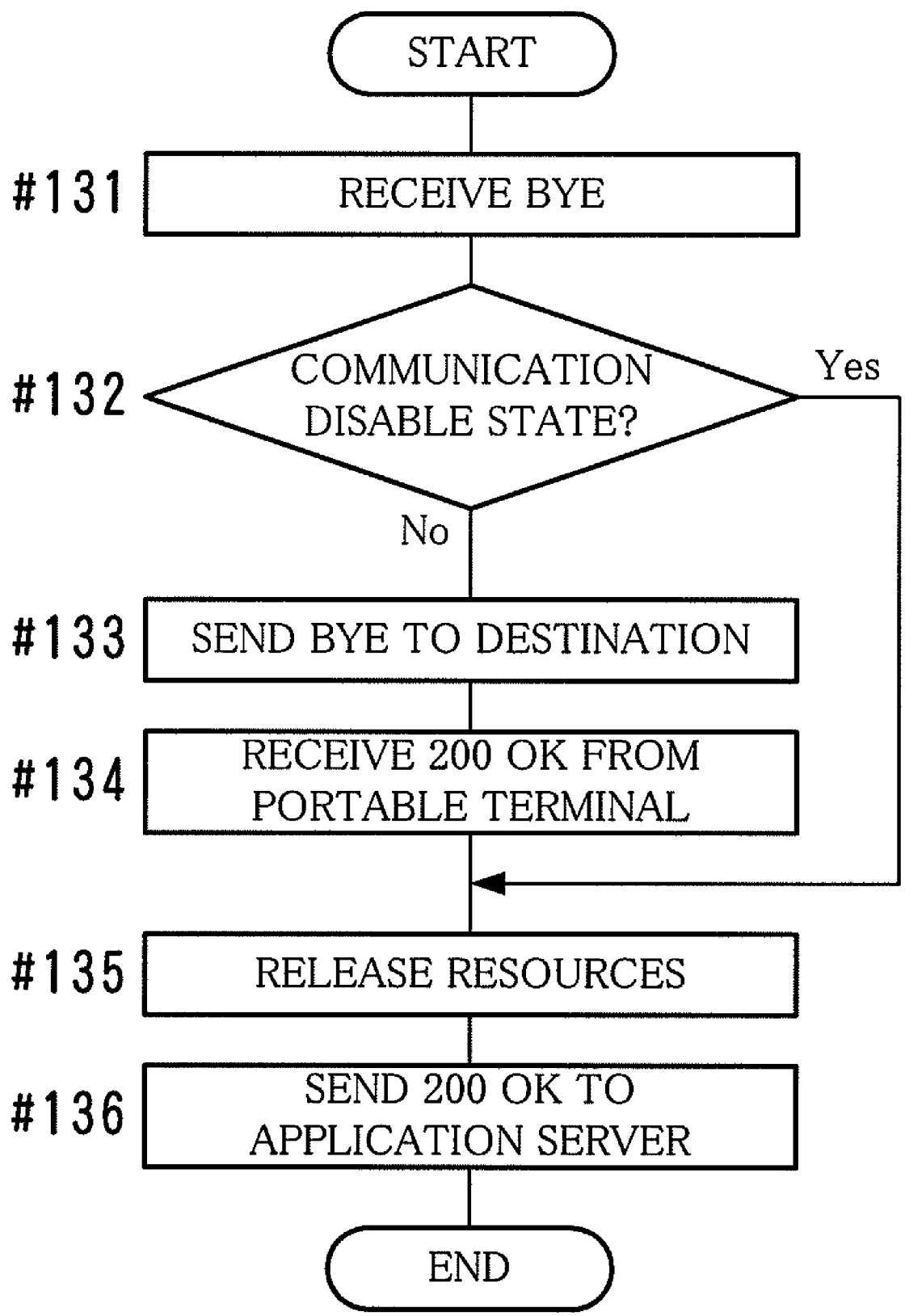
FIG. 7 is a flowchart for explaining a process flow of an SIP server when "BYE" is received.

FIG. 7 is a flowchart for explaining a process flow of the SIP server 1 when "BYE" is received.

In FIG. 7, when the SIP server 1 receives the message data MS about "BYE" (#131), it is determined whether or not the message data MS is one that indicates start of the call disconnection process based on a communication disable state of the portable terminal TR (#132). If it is not the one indicating the start of the call disconnection process based on a communication disable state (No in #132), the message data MS is transmitted to the portable terminal TR of the destination indicated there (#133). Thus, "BYE" is sent to the portable terminal TR.

When "200 OK" corresponding to the "BYE" (the message data MS indicating "200 OK") is given from the portable terminal TR, it is received (#134). After receiving "200 OK", deletion or the like of the user data is performed, so that resources for the call control that were secured for the portable terminal TR are released (#135). In addition, in parallel with this, or before or after this, the "200 OK" is transmitted to the application server 2 (#136).

If the message data MS about "BYE" that was received in the step #131 is the one that indicates start of the call disconnection process based on a communication disable state (Yes in #132), the message data MS is not transmitted to the portable terminal TR of the destination (i.e., the portable terminal TR that is detected to be a communication disable state), but the process of the step #135 and the subsequent steps is performed. In other words, resources for the call control that were secured for the portable terminal TR of the destination indicated in the message data MS are released (#135). Then, "200 OK" indicating acknowledgement to the message data MS is transmitted to the application server 2 (#133).

As described above, in the present embodiment, if the received message data MS indicates that a communication disable state is detected, the SIP server 1 does not transmit the message data MS to the portable terminal TR that is indicated as the destination in the same but skips the transmission process. Then, it transmits the message data MS about "BYE" that will be transmitted later only to the other portable terminal TR. Thus, the call disconnection process is shortened compared with the conventional method.

In addition, if a communication disable state is not indicated, the message data MS is transmitted to the portable terminal TR of the destination. After that, the message data MS about "BYE" that will be further transmitted for a destination of the other portable terminal TR is transmitted to the other portable terminal TR. In other words, in this case, "BYE" is transmitted to both the portable terminals TR.

There is a case where no acknowledgement is given from the portable terminal with respect to the SIP message transmitted from the SIP server or the like in mobile communication. If no acknowledgement is given from the portable terminal, the process cannot be continued after that. Such a situation may occur frequently in particular when "BYE" is transmitted to the portable terminal whose communication disable state was detected as shown in the step #955 of FIG. 11. It is because there is high probability that such a portable terminal cannot receive "BYE" because it is outside the communication range or it cannot transmit "BYE" because it is outside the communication range again after it received "BYE" when it was once within the communication range in a bad communication environment.

In the present embodiment, the SIP server 1 does not transmit the message data MS about "BYE" transmitted from the application server 2 when a communication disable state was detected to the portable terminal TR whose communication disable state was detected, but it skips the transmission process and goes to the next process. In other words, it automatically releases resources that were secured for the portable terminal TR and transmits "200 OK" for the "BYE" to the application server 2. Thus, the malfunction described above can be reduced compared with the conventional method.

In addition, conventionally, as shown in FIG. 12, there is a method in which a response time is set for the reply to "BYE" from the portable terminal B, and when the response time has passed, the next process is continued. In other words, a session timer is started at the timing when "BYE" is transmitted in the step #973 of FIG. 12 (#975). Until the time when "200 OK" is sent with respect to the "BYE", "BYE" is retransmitted at a predetermined timing (#976-#979). If the session timer finished (#980), resources for the call control that were secured for the portable terminal B are released (#981), and "200 OK" is transmitted to the application server (#982). Then, the subsequent process is continued.

In such a conventional method, "BYE" is retransmitted until the session timer finishes, so it causes unnecessary increase of traffic. In addition, since waiting state occurs until the session timer finished and therefore releasing of resources is delayed, process efficiency is lowered as a whole.

In the present embodiment, "BYE" is not transmitted to the portable terminal TR whose communication disable state is detected, but the subsequent process is continued automatically. Therefore, waiting time due to the protocol timer can be shortened, so that the decrease of process efficiency as described above can be suppressed. This effect can be obtained in particular when a plurality of portable terminals TR become a communication disable state at the same time.

Although the present embodiment exemplified the case where portable terminals perform speech communication with each other, one of the terminals that perform the speech communication may be a fixed telephone or a personal computer or the like.

In the present embodiment, in FIG. 5, the portable terminal TR2 to which the "BYE" message should be transmitted first, i.e., to which the SIP message about a request for the process of finishing the call should be transmitted can be handled as the UAS. In addition, the portable terminal TR1 on the other end can be handled as the UAC.

In addition, it is possible to realize the call control described above in the present embodiment by other device such as a base station control device of mobile phones. For example, the base station control device controls transmission of the SIP message. In other words, "BYE" that is transmitted to the portable terminal TR when the portable terminal TR becomes a communication disable state may be discarded in the base station control device so that it is not transmitted to the portable terminal TR. Then, the base station control device sends "200 OK" for the "BYE". Further in this case, it is possible that the base station control device can detect a communication disable state of the portable terminal TR.

Note that the SIP server 1 can perform communication with the application server 2 by using the SIP and with the subscriber information management server 3 by using the Diameter.

Furthermore, the mobile communication network MCN, the structures and the functions of the individual portions of the call management system KKS, the SIP server 1, and the application server 2, the contents indicated in each data, the contents or the order of the process, and the like can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A call management system that is used for a mobile communication network, comprising
   a first server system and a second server system, wherein
   the first server system includes
      a detector that detects that one of terminal devices under speech communication with each other has become a communication disable state, and
      a transmitter that transmits first information to the second server system when the detector detected the communication disable state, the first information including a fact that the communication disable state is detected and data for identifying the terminal device that has become a communication disable state, and
   the second server system includes
      a receiver that receives the first information from the first server system,
      a discriminator that, from the first information thus received, determines whether or not the first information is transmitted because of the communication disable state and identifies a terminal device that has become the communication disable state when it is determined that the first information is transmitted because of the communication disable state, and
      a processor that performs a process for finishing the speech communication by transmitting a message to the terminal devices under the speech communication with each other, and wherein,
   if a user performs an operation for finishing speech communication, the processor transmits the message to every terminal device under the speech communication, and
   if the discriminator determines that the first information is transmitted because of the communication disable state, the processor skips transmitting the message to said one of terminal devices that is identified as the terminal device that has become the communication disable state and transmits the message to the terminal device on the other end of the speech communication with the terminal device that is determined to have become the communication disable state.

2. The call management system according to claim 1, wherein
   the first server system includes a first resource release processor that performs a process for releasing resources in the first server system that are secured for each of the terminal devices under the speech communication, and
   the first resource release processor releases the resources in the first server system that are secured for the terminal device whose communication disable state is detected, when the detector detects the communication disable state.

3. The call management system according to claim 1, wherein the second server system includes a second resource release processor that performs a process for releasing resources in the second server system that are secured for each of the terminal devices under the speech communication, and
   the second resource release processor releases the resources in the second server system that are secured for said one of terminal devices identified by the discriminator as the terminal device that has become the communication disable state immediately after the processor skips transmitting the message to said one of terminal devices.

* * * * *